(12) United States Patent
Zhang et al.

(10) Patent No.: US 12,059,818 B1
(45) Date of Patent: Aug. 13, 2024

(54) CONSTRUCTION MATERIAL AND METHOD FOR MANUFACTURING SAME

(71) Applicants: Zhili Zhang, Beijing (CN); Mike Liu, Riverside, CA (US)

(72) Inventors: Zhili Zhang, Beijing (CN); Mike Liu, Riverside, CA (US)

( * ) Notice: Subject to any disclaimer, the term of this patent is extended or adjusted under 35 U.S.C. 154(b) by 0 days.

(21) Appl. No.: 18/230,420

(22) Filed: Aug. 4, 2023

(51) Int. Cl.
*B27N 3/18* (2006.01)
*B27N 1/00* (2006.01)
*B27N 3/00* (2006.01)
*B29C 53/00* (2006.01)
*B29C 53/16* (2006.01)

(52) U.S. Cl.
CPC ............. *B27N 3/18* (2013.01); *B27N 1/00* (2013.01); *B27N 3/002* (2013.01); *B29C 53/00* (2013.01); *B29C 53/16* (2013.01)

(58) Field of Classification Search
CPC .. B27N 3/18; B27N 1/00; B27N 3/002; B29C 53/00; B29C 53/16
See application file for complete search history.

(56) References Cited

U.S. PATENT DOCUMENTS

| | | | | |
|---|---|---|---|---|
| 2008/0277055 | A1* | 11/2008 | Yang | B27N 3/08 156/272.2 |
| 2011/0293880 | A1* | 12/2011 | Yu | B27J 1/003 144/333 |
| 2019/0322821 | A1* | 10/2019 | Dufrancatel | B29B 7/92 |
| 2020/0282591 | A1 | 9/2020 | Hu | |

FOREIGN PATENT DOCUMENTS

| CN | 101157225 A | * | 4/2008 |
|---|---|---|---|
| CN | 109808016 A | * | 5/2019 |

* cited by examiner

*Primary Examiner* — Jacob T Minskey
*Assistant Examiner* — Caroline Beha
(74) *Attorney, Agent, or Firm* — Ying-Ting Chen; Law Office of Michael Chen

(57) ABSTRACT

In one aspect, a method for manufacturing a composite material for structural applications may include steps of sawing and arranging bamboo woods into bamboo bundles; heating the bamboo bundles; dipping the bamboo bundles in phenolic resin; drying the bamboo bundles; arranging the bamboo bundles with the green surface facing outside and the yellow surface facing inside; and forming bamboo beams with a hot-pressing process.

4 Claims, 5 Drawing Sheets

| No. | Test Item | Unit | Requirement | Result | Conclusion |
|---|---|---|---|---|---|
| 1 | Moisture content | % | 6-10 | 8.6 | Excellent |
| 2 | Compressive strength of along grain | MPa | ≥73 | 82.1 | Excellent |
| 3 | Bending strength | MPa | ≥115 | 143.7 | Excellent |
| 4 | Flexural modulus of elasticity | MPa | ≥12300 | 13580 | Excellent |
| 5 | Shear strength of along grain | MPa | ≥10.0 | 15.7 | Excellent |
| 6 | Cross grain compression | MPa | ≥24.0 | Partial compression: 54.4 Entire Compression: 61.0 | Excellent |
| 7 | Formaldehyde emission | Mg/L | E1≤1.5 | 0.24 | Excellent |
| Remarks | Formaldehyde emission shall be in accordance with the regulation of GB/T 17657-2013.4.59 | | | | |

FIG. 3

1. GB/T 8626 flammability of building materials
Testing result

| Method | Requirement | Number of sample | Result |
|---|---|---|---|
| GB/T 8626 Ignition time of surface for 30s | Fs ≤ 150mm | 6 | YES |
| | Whether the filter paper is ignited | | NO |
| GB/T 8626 Ignition time of edge for 30s | Fs ≤ 150mm | 6 | YES |
| | Whether the filter paper is ignited | | NO |

2. GB/T 20284 Single burning test of building materials or products
Testing result

| Method | Requirement | Number of sample | Result |
|---|---|---|---|
| GB/T 20284 | FIGRA 0.2MJ (W/S) | 6 | 0 |
| | LFS < Edge of sample | | YES |
| | THR 600s (MJ) | | 0 |
| | SMOGRA (m²/s²) | | 0 |
| | TSP 600s (m²) | | 0 |
| | Combustion droplets / particles | | None |
| | Combustion droplets / particles f<10s | | / |
| | Combustion droplets / particles f<10s | | / |

Remark:
FIGRA 0.2MJ: Combustion growth rate index when the combustion heat release of the sample reaches 0.2mj
THR 600s: The total heat release of the specimen in the first 600 seconds of the main burner
LFS: Transverse propagation of flame on the long wing of specimen
SMOGRA: Flu gas generation rate index
TSP 600s: Total smoke production in 600s
/: Representative not applicable Grade: The rating shall be in accordance with GB 8624-2012

FIG. 4

| Grade | Quality loss rate |
|---|---|
| I Strong corrosion resistance | 0 – 10% |
| II Corrosion resistance | 11 – 24% |
| III Slightly Corrosion resistance | 25 – 44% |
| IV Intolerance Corrosion resistance | >45% |

| Samples | Rate of quality loss (%) | | | Corrosion resistance grade |
|---|---|---|---|---|
| | Brown-rot | White rot fungi | Average value | |
| Poplar | 51.92 | 54.49 | 53.20 | IV |
| Bamboo based conforming material | 11.98 | 11.67 | 11.83 | II |

FIG. 5

CONSTRUCTION MATERIAL AND METHOD FOR MANUFACTURING SAME

FIELD OF THE INVENTION

The present invention relates to a construction material and manufacturing method thereof for the construction material "Bamboo Phoebe Zhennan," which is also called "Zhunanmu."

BACKGROUND OF THE INVENTION

Bamboo belongs to the sub-bamboo family of the gramineae and it is one of the fastest growing plants in the world. The growth cycle of bamboo is usually four to five years, after which it can be cut down and used. Bamboo grows in large areas through roots that spread underground. The underground rhizome of bamboo can continuously grow new bamboo, and the new bamboo can promote the growth of underground rhizome. According to this characteristic of cyclic growth, bamboo can be inexhaustible.

There are over 600 kinds of bamboo in the world. They mainly distributed in some countries in Asia, Africa and Latin America. There is no natural bamboo in Europe and very little native bamboo in North America. Asia is the world's largest bamboo production area, with more than 50 genera and more than 900 species, of which about 100 species are of economic value. The major bamboo producers are China, India, Burma, Thailand, Bangladesh, Vietnam and Japan.

China is the world's leading bamboo producer, with 30% of the world's bamboo forests. The species, area, storage and yield of bamboo are the highest in the world. There are more than 50 genera and more than 900 species in China, with an area of about 4.2 million square meters. Bamboo forest resources are concentrated in Sichuan, Zhejiang, Jiangxi, Anhui, Hunan, Hubei, Fujian, Guangdong and western regions. Fujian, Zhejiang, Jiangxi and Hunan have the most bamboo resources, with 60.8% of the country's bamboo forest area. Due to the differences in climate, soil and topography and the biological characteristics of bamboo, bamboo in China has obvious regional differences.

Bamboo has excellent mechanical properties due to its unique biological characteristics of bamboo fibers. Bamboo fibers can be divided into primary cell walls and secondary cell walls. These cell layers are mostly composed of cellulose, hemicellulose, lignin, etc. The ratio of these elements is about 2:1:1 and account for about 95% of the total weight. In each layer of cellulose, there are crystalline components of cellulose microfibrils arranged in a spiral manner. The structure of the hollow, multi-layer helix of the bamboo fiber is very reasonable. Crystalline cellulose is arranged in disorder on the primary cell wall and in longitudinal parallel arrangement along the secondary cell wall. This structure is an important reason for the high strength of bamboo fibers.

Bamboo has a very small amount of shrinkage rate and a high elasticity and toughness. Its static bending strength and elastic modulus are twice as much as that of regular woods. According to the measurement, the tensile strength of bamboo along the rift grain is up to 150 Mpa, the compressive strength is 65 Mpa. The hardness of bamboo is about half of ordinary steel of the same cross-sectional size. If the tensile strength per unit mass is calculated, the tensile strength per unit mass of bamboo is about 25 times higher than steel.

Also, bamboo is a material with great environmental and ecological benefits. It is of great ecological significance to use it in architecture. The urban construction may have requirements on the environmental performance of building materials, and according to the ecological properties of the material, every ton of bamboo releases 1.07 tons of oxygen and absorbs 1.47 tons of carbon dioxide during the growth process. The production of 1 ton of ordinary Portland cement clinker emits 1 ton of carbon dioxide, 0.74 tons of sulfur dioxide and 130 kg of dust. The production of 1 square meter of steel, the emission of 5320 kilograms of carbon dioxide. In the production of ordinary Portland cement and steel, it also needs to consume a large number of stone and minerals and other non-renewable resources.

Currently, China does not have much wood available for commercial use and relies heavily on imports. The eco-friendly wood architecture advocated by western countries cannot be promoted in China, because China's per capita timber reserves are insufficient and the price of wood is high. Thus, bamboo is the best substitute for wood because it is abundant and has excellent properties.

SUMMARY OF THE INVENTION

In one aspect, a method for manufacturing a composite material for structural applications may include steps of sawing and arranging bamboo woods into bamboo bundles; heating the bamboo bundles; dipping the bamboo bundles in phenolic resin; drying the bamboo bundles; arranging the bamboo bundles with the green surface facing outside and the yellow surface facing inside; and forming bamboo beams with a hot-pressing process.

In one embodiment, the step of sawing and arranging bamboo woods into bamboo bundles may include steps of sawing the bamboo woods to long bamboo tubes of 2.6 meter, and putting together a predetermined amount of bamboo tubes into a bamboo bundle.

In another embodiment, the step of heating the bamboo bundles may include steps of heating the bamboo bundles at 200° C. for 2 hours with water vapor; and drying the bamboo bundles to 6% to 8% moisture content. In still another embodiment, the step of dipping the bamboo bundles in phenolic resin may include a step of immersing the bamboo bundles in 20% phenolic resin for 4 to 6 minutes.

In a further embodiment, the step of forming bamboo beams with a hot-pressing process may include steps of first hot pressing the bamboo bundles at 145° C. and under the pressure of 0.35-0.40 mpa with the holding time 1.0 min/mm; and second hot pressing the bamboo bundles at 55-60° C. to 18 mm, and the density thereof is controlled at 1.1 g/cm$^3$.

It is noted that the finished product can be named "Zunanmu," which is considered a bamboo fiber composite and imitation wood material. It can also be considered a "reconstituted bamboo."

According to the manufacturing process stated above, Zunanmu has been made through high-temperature carbonization and high pressure, which make Zunanmu a fire-resistant construction material achieving the BI antifire safety standard. The antifire materials like Zunanmu can be flame-retardant, meaning when fire is close to the material, the material will not easily be burned and even when the material is burned, it would not cause serious damages thereon and when the fire is moved away, the burning on the material will immediately stop.

BRIEF DESCRIPTION OF THE DRAWINGS

FIG. 3 illustrates basic properties of Zunanmu including moisture content, compressive strength, bending strength, elasticity, shear strength, cross gram compression, and formaldehyde emission.

FIG. 4 illustrates the flammability and burning tests results of Zunanmu in the present invention.

FIG. 5 illustrates the test results of corrosion resistance of Zunanmu in the present invention.

DETAILED DESCRIPTION OF THE INVENTION

Figure 1:
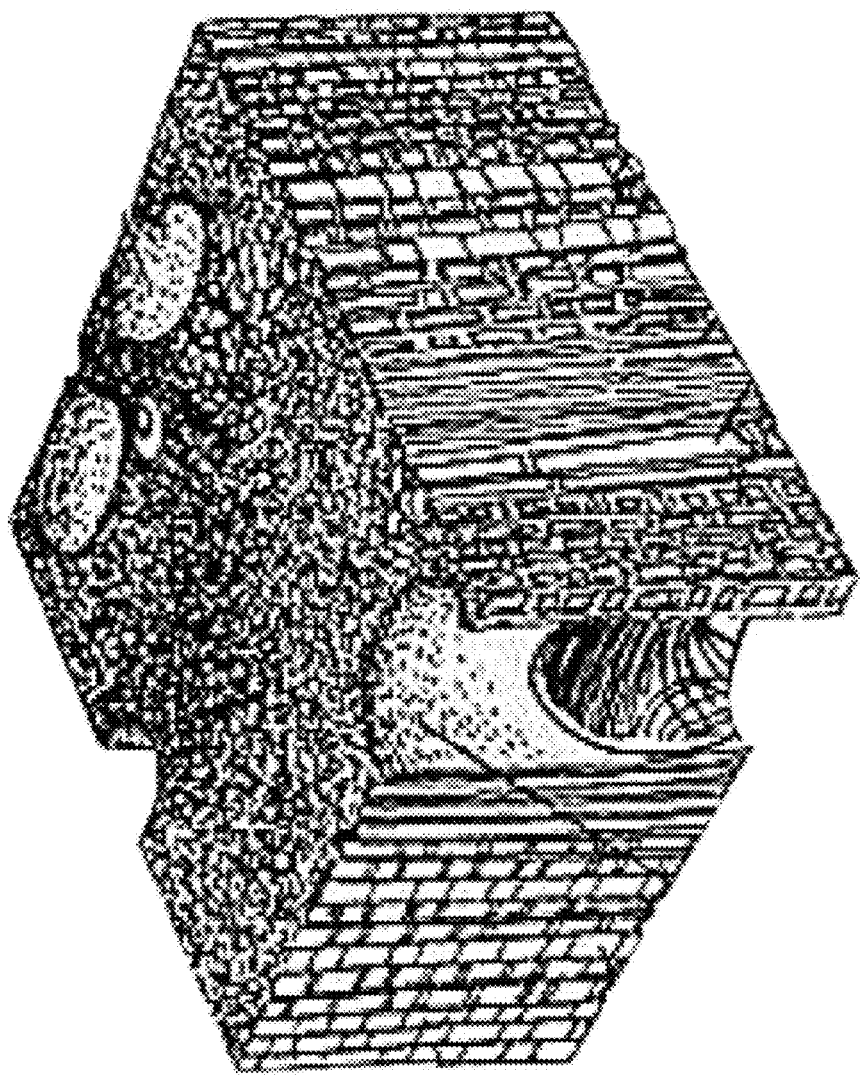
FIG. 1 is a schematic diagram for a cross section of a bamboo.
Figure 2:
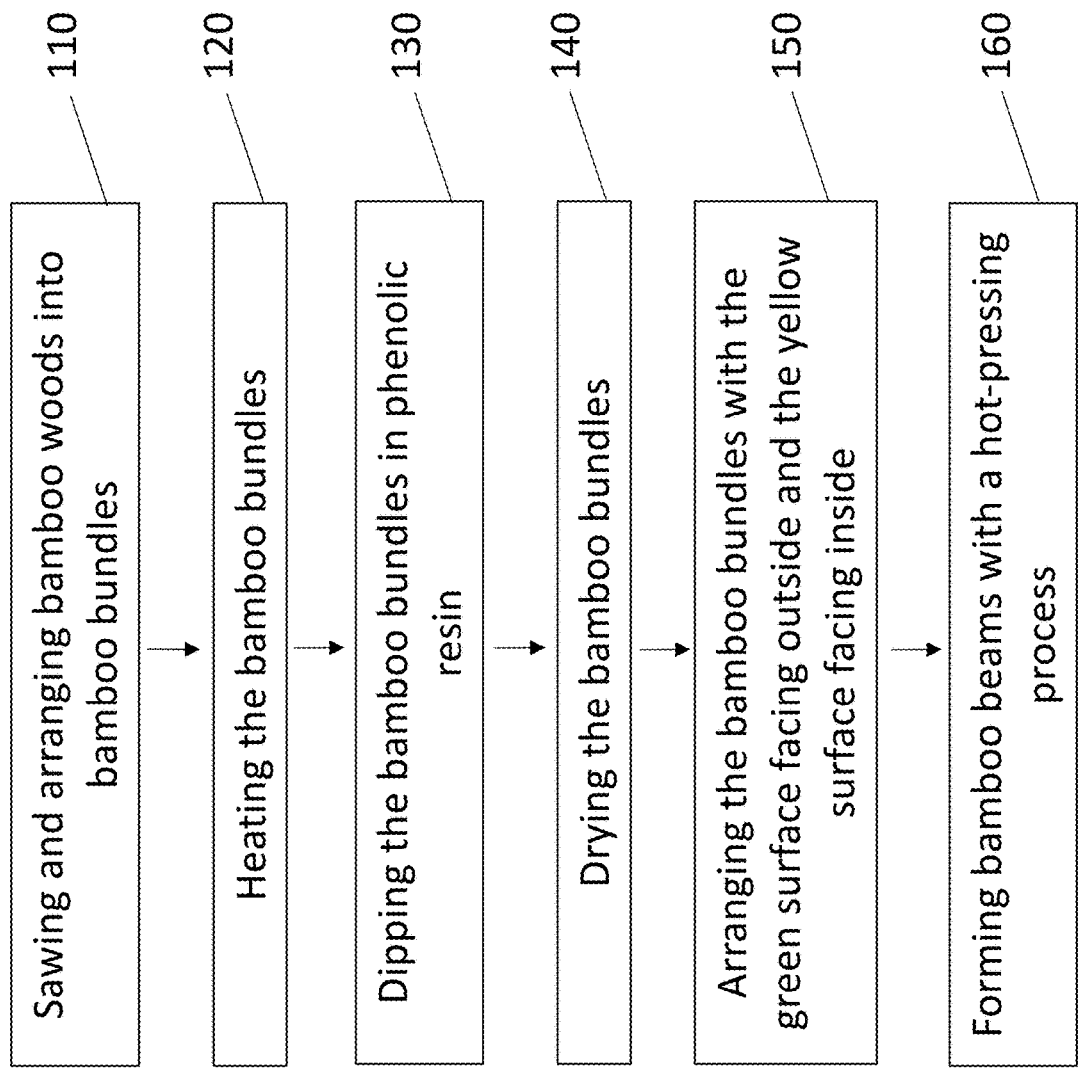
FIG. 2 is a block diagram of a method for manufacturing a composite material for structural applications in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In recent years, environmental friendly building and decoration materials have been highly recognized, and environmentally friendly materials such as wood and bamboo have gained much attention. Bamboo and wood structures are superior to reinforced concrete and brick structures in insulation, energy saving, environmental protection, comfort, earthquake resistance, material regeneration and recycling. This has aroused positive attentions from experts, scholars, designers, architects, manufacturers and the public.

Bamboo has excellent mechanical properties due to its unique biological characteristics of bamboo fibers. Bamboo fibers can be divided into primary cell walls and secondary cell walls. These cell layers are mostly composed of cellulose, hemicellulose, lignin, etc. The ratio of these elements is about 2:1:1 and account for about 95% of the total weight. In each layer of cellulose, there are crystalline components of cellulose microfibrils arranged in a spiral manner. The structure of the hollow, multi-layer helix of the bamboo fiber is very reasonable. Crystalline cellulose is arranged in disorder on the primary cell wall and in longitudinal parallel arrangement along the secondary cell wall. This structure is an important reason for the high strength of bamboo fibers. The comparison of the characteristics of bamboo, spruce, concrete and steel is shown as below:

|  | Bamboo | Spruce | Concrete | Steel |
| --- | --- | --- | --- | --- |
| Tensile Strength (N/mm$^2$) | 35-300 | 90 | 1.26-12.6 | 250-350 |
| Compressive Strength (N/mm$^2$) | 64-110 | 43 | 12.6-126 | 250-350 |
| Density (Kg/m$^3$) | 600 | 43 | 2400 | 7800 |
| Regeneration Capacity | 80-300% | 3-6% | N/A | N/A |
| Ripening Time (Year) | 7-9 | 60-80 | N/A | N/A |
| Re-ripening after being cut (Year) | 1 | 60-80 | N/A | N/A |
| Pollution Level | Slight | Slight | Severe | Medium |
| Waste Disposal | Easy | Easy | Construction Waste | Reusable |

Also, bamboo is a material with great environmental and ecological benefits. It is of great ecological significance to use it in architecture. The urban construction may have requirements on the environmental performance of building materials, and according to the ecological properties of the material, every ton of bamboo releases 1.07 tons of oxygen and absorbs 1.47 tons of carbon dioxide during the growth process. The production of 1 ton of ordinary Portland cement clinker emits 1 ton of carbon dioxide, 0.74 tons of sulfur dioxide and 130 kg of dust. The production of 1 square meter of steel, the emission of 5320 kilograms of carbon dioxide. In the production of ordinary Portland cement and steel, it also needs to consume a large number of stone and minerals and other non-renewable resources. The following table is the impact factor to the environment of the life cycle of the construction materials.

|  | Water Pollution | Greenhouse Effect | Air Pollution | Solid Waste |
| --- | --- | --- | --- | --- |
| Bamboo | 1 | 1 | 1 | 1 |
| Steel | 1.2 | 1.47 | 1.44 | 1.37 |
| Cement | 0.9 | 1.88 | 1.69 | 1.95 |

In one aspect, a method for manufacturing a composite material for structural applications may include steps of sawing and arranging bamboo woods into bamboo bundles 110; heating the bamboo bundles 120; dipping the bamboo bundles in phenolic resin 130; drying the bamboo bundles 140; arranging the bamboo bundles with the green surface facing outside and the yellow surface facing inside 150; and forming bamboo beams with a hot-pressing process 160.

In one embodiment, the step of sawing and arranging bamboo woods into bamboo bundles may include steps of sawing the bamboo woods to long bamboo tubes of 2.6 meter, and putting together a predetermined amount of bamboo tubes into a bamboo bundle.

In another embodiment, the step of heating the bamboo bundles may include steps of heating the bamboo bundles at 200° C. for 2 hours with water vapor; and drying the bamboo bundles to 6% to 8% moisture content. In still another embodiment, the step of dipping the bamboo bundles in phenolic resin may include a step of immersing the bamboo bundles in 20% phenolic resin for 4 to 6 minutes.

In a further embodiment, the step of forming bamboo beams with a hot-pressing process may include steps of first hot pressing the bamboo bundles at 145° C. and under the pressure of 0.35-0.40 mpa with the holding time 1.0 min/mm; and second hot pressing the bamboo bundles at 55-60° C. to 18 mm, and the density thereof is controlled at 1.1 g/cm$^3$.

It is noted that the finished product can be named "Zunanmu," which is considered a bamboo fiber composite and imitation wood material. It can also be considered a "reconstituted bamboo."

According to the manufacturing process stated above, Zunanmu has been made through high-temperature carbonization and high pressure, which make Zunanmu a fire-resistant construction material achieving the BI antifire safety standard. The antifire materials like Zunanmu can be flame-retardant, meaning when fire is close to the material, the material will not easily be burned and even when the material is burned, it would not cause serious damages thereon and when the fire is moved away, the burning on the material will immediately stop.

FIG. 3 illustrates basic properties of Zunanmu including moisture content, compressive strength, bending strength, elasticity, shear strength, cross gram compression, and formaldehyde emission; and Zunanmu can meet all requirement to be an excellent constructional material. FIG. 4 shows that Zunanma has passed a flammability test and a burning test for building materials; and FIG. 5 shows Zunanmu shows good corrosion resistance (Grade II).

As stated above, in recent years, environmental friendly building and decoration materials have been highly recognized, and environmentally friendly materials such as wood and bamboo have gained much attention. Bamboo and wood structures are superior to reinforced concrete and brick structures in insulation, energy saving, environmental protection, comfort, earthquake resistance, material regeneration and recycling, which has aroused the positive attention of experts, scholars, designers, architects, manufacturers and the public.

Zunanmu that made by bamboo is free of chemical and radioactive materials and is not harmful to humans. Also, it has the natural aroma and can reduce the environmental pollution of the construction project. Furthermore, Zunanmu is a very stable, long life, durable and renewable non-polluting materials. Century-old wooden houses are common, dating back as far as the 18th century.

Zunanmu can also be used for beams for structural design for either interior or exterior decoration of the construction project. For the interior design, if Zunanmu is not used for load-bearing, it can be positioned in different locations inside the house according to the house owner's preference.

Furthermore, Zunanmu has good thermal insulation so the house built with Zunammu can keep warm in winter and cool in summer. The house frame structure made by Zunanmu is strong enough even for earthquake. In the Kobe earthquake in Japan and Sichuan earthquake in China, there was less damage to the wooden structure buildings, which provided a basis for the earthquake resistance of the wooden structure houses. Also, bamboo has a moisture content of only 17%, so the building made by bamboo/Zunanmu keeps the building materials dry.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A method for manufacturing a composite material for structural applications comprising steps of:
    sawing and arranging bamboo woods into bamboo bundles;
    heating the bamboo bundles;
    dipping the bamboo bundles in phenolic resin;
    drying the bamboo bundles;
    arranging the bamboo bundles with the green surface facing outside and the yellow surface facing inside; and
    forming bamboo beams with a hot-pressing process,
    wherein the step of forming bamboo beams with a hot-pressing process include steps of first hot pressing the bamboo bundles at 145° C. and under the pressure of 0.35-0.40 mpa with the holding time 1.0 min/mm; and second hot pressing the bamboo bundles at 55-60° C. to 18 mm, and the density thereof is controlled at 1.1 g/cm$^3$.

2. The method for manufacturing a composite material for structural applications of claim 1, wherein the step of sawing and arranging bamboo woods into bamboo bundles include steps of sawing the bamboo woods to long bamboo tubes of 2.6 meter, and putting together a predetermined amount of bamboo tubes into a bamboo bundle.

3. The method for manufacturing a composite material for structural applications of claim 1, wherein the step of heating the bamboo bundles include steps of heating the bamboo bundles at 200° C. for two hours with water vapor; and drying the bamboo bundles to 6% to 8% moisture content.

4. The method for manufacturing a composite material for structural applications of claim 1, wherein the step of dipping the bamboo bundles in phenolic resin include a step of immersing the bamboo bundles in 20% phenolic resin for 4 to 6 minutes.

* * * * *